Patented Jan. 26, 1943

2,309,187

UNITED STATES PATENT OFFICE 2,309,187

TREATMENT OF HIDES

John Marshall Grim and William O. Dawson, Stamford, Conn., assignors to American Cyanamid Company, New York, N. Y., a corporation of Maine No Drawing. Application October 14, 1941, Serial No. 414,938

3 Claims. (Cl. 149—5)

This invention relates to the treatment of hides and more particularly to a process for white tanning of hides and to the products obtainable thereby.

According to the present invention, white tanned leathers may be obtained by treating hides with an aqueous solution of a hydrophile condensation product of ammeline and formaldehyde. Processes for the preparation of these condensation products and certain of the same are described in the application of J. M. Grim, Serial No. 376,849, filed January 31, 1941.

As described in application Serial No. 376,849, these materials which constitute the synthetic tanning agents of the process of the present invention are condensation products of one mol of ammeline and about 2–4 mols of formaldehyde partially neutralized with an alkali of the group consisting of sodium and potassium hydroxides. Broadly stated, the condensation products may be prepared by causing ammeline and formaldehyde, in the proportions indicated, and a sufficient amount of the alkali to react to form a water-soluble condensation product. The amount of the alkali required for solubilizing the condensation products will vary and is dependent upon the ratio of formaldehyde combined with the ammeline in the condensation product; the higher this ratio, the less alkali required. The amount of alkali will also vary with the conditions under which the condensation is effected, more alkali being required where it is added to the initial reaction mixture containing free formaldehyde, and the condensation is carried out by refluxing the mixture. The increase in consumption of alkali in such instances is due to reaction of part of it with free formaldehyde. This reaction, which is known as the Cannizzaro reaction, is aided by heat.

The synthetic tanning materials of the process of the present invention are characterized by being acid-sensitive and dilutable with water within a wide range without precipitation of the solid form of the condensation product.

Acid-sensitive, water-soluble, hydrophile ammeline formaldehyde condensation products of one mol of ammeline and from about 2 to about 3 mols of formaldehyde may be prepared by heating a mixture of ammeline and formaldehyde in the indicated proportions and sodium or potassium hydroxide at a temperature of about 50° to 80° C., until a clear reaction mixture is obtained. The following specific examples illustrate the preparation of such products of lower formaldehyde ratio, the parts being by weight.

Example 1

A mixture of 31.8 parts (0.25 mol) of finely ground ammeline (100 mesh), 40.5 parts of 37% formalin (0.5 mol of formaldehyde) and 7 parts of sodium hydroxide in the form of a 10% solution, was heated to 50° C. The reaction mixture cleared up almost immediately. The syrupy product was water-soluble. The total quantity of alkali added mounted to about 22% on the weight of the ammeline employed.

Example 2

2702 parts (21.27 mols) of finely ground ammeline and 3909 parts of 37% formalin (48.26 mols of formaldehyde) were put into a stainless steel container. To these was added, with stirring, a solution of 675.6 parts of sodium hydroxide in 892.5 parts of water, and then an additional 892.5 parts of water, making a total of 1785 parts of water added. The amount of the alkali used was about 25% sodium hydroxide on the weight of the ammeline. The mixture was heated, with stirring, from an initial temperature of 70° C. to 80° C. in 40 minutes and maintained at this latter temperature with continued stirring for ½ hour. The reaction mixture was immediately filtered under suction and the filtrate made up to about 9072 parts with water.

A second batch was prepared in a similar manner employing 2650 parts (20.9 mols) of ammeline, 3909 parts of 37% formalin (48.26 mols of formaldehyde), 675.6 parts of sodium hydroxide and 1773 parts of water. The sodium hydroxide and the water were added to the ammeline and formaldehyde in the manner described above. The mixture was heated with stirring from an initial temperature of 72° C. to 80° C. in 20 minutes, the mixture being maintained at 80° C. for an additional 35 minutes. The reaction mixture was immediately filtered under suction, and the filtrate made up to 9008 parts with water. The amount of the alkali employed was about 25.5% on the weight of the ammeline. The two batches of the product were combined to give a syrup having a solid resin content of 50% based on the weight of the ammeline, formaldehyde and water employed, and a pH of 11.6.

Example 3

A mixture of 31.8 parts (0.25 mol) of ammeline, 61 parts of 37% formalin (0.75 mol of formaldehyde), and 7.5 parts of sodium hydroxide in the form of a 10% solution, was heated.

The reaction mixture cleared up by the time the temperature reached 50° C. The product syrup, which was water-soluble, had a pH of about 11.3. The total quantity of alkali added amounted to about 23.58% on the weight of the ammeline employed.

The preparation of acid-sensitive, water-dilutable, hydrophile condensation products of higher formaldehyde ratio, i. e., from about 3 to 4 mols of formaldehyde per mol of ammeline, is illustrated by the following specific examples. In this procedure the ammeline and formaldehyde are preferably first condensed by heating and the required amount of the alkali for solubilizing the condensation products is added to the resulting mixture after a controlled cooling of the same. The reaction mixture is cooled before addition of the alkali in order to diminish reaction between any free formaldehyde present and the alkali.

*Example 4*

31.8 parts (0.25 mol) of finely ground ammeline were mixed with 77.4 parts of 37% formalin (0.955 mol of formaldehyde) and the mixture refluxed for 10 minutes, whereupon it cleared up completely. After cooling the reaction mixture to 60° C., 0.3 part of sodium hydroxide in the form of a 10% solution was added thereto with stirring. The mixture was then cooled to 25° C. and 1.5 parts of sodium hydroxide added in the form of a 20% solution. The pH of the clear syrup was 7.1 and, on standing, the syrup formed a water-soluble gel. The total quantity of alkali employed was about 5.66% on the weight of the ammeline.

*Example 5*

31.8 parts (0.25 mol) of finely ground ammeline were mixed with 61 parts of 37% formalin (0.75 mol of formaldehyde) and the mixture refluxed for 15 minutes. To the reaction mixture, after cooling to 85° C., was added 1 part of sodium hydroxide in the form of a 10% solution. When the temperature of the mixture dropped to below 50° C., another 1 part of sodium hydroxide in the form of a 10% solution was added. At 30° C. the mixture was practically completely water-soluble. The pH of the syrup was 8.1 and, on standing for about 24 hours, formed a water-soluble gel. The total amount of alkali employed was about 6.29% on the weight of the ammeline.

*Example 6*

64 parts (0.5 mol) of finely group ammeline (100 mesh), 60 parts (2 mols) of formaldehyde (40%) and 13 parts of a 50% sodium hydroxide solution were refluxed until clear. The clear, acid-sensitive, water-dilutable syrup had a pH of 9.3 and an ammeline-formaldehyde resin content of 58% on the solid basis.

*Example 7*

64 parts (0.5 mol) of finely ground ammeline (100 mesh), 60 parts (2 mols) of formaldehyde (40%), and 10 parts of a 50% sodium hydroxide solution were refluxed until clear. A clear, acid-sensitive, water-dilutable syrup with a pH of 7.4 was obtained.

As previously mentioned, the hydrophile condensation products have the properties of being acid-sensitive and dilutable with water within a wide range without precipitation of the solid form of the condensation product. In water diluted condition, the soluble products may be converted to the hydrophobe state by the addition of acid, resulting in precipitation of a white solid resin. These properties of the hydrophile condensation products are employed by the process of the present invention for the white tanning of hides.

In their application, the resin syrup diluted with water is brought into contact with the hide which, being acid, causes precipitation of the ammeline-formaldehyde condensation product in the form of a white solid in and upon the fibriles of the hide. The amount of condensation product employed may be varied and may be, for example, 2-10% calculated as solid resin on the pickled weight of the hides.

The application of the hydrophile ammeline-formaldehyde condensation products to the white tanning of hides is illustrated by the following specific examples, to which, however, the invention is not to be limited, and in which the parts are by weight.

*Example 8*

20 parts of pickled kid skin, 20 parts of a 15% sodium chloride solution and 4 parts of the resin syrup of Example 6 (about 58% solid resin) were drummed overnight. Part of the treated skins were removed from the tanning bath, washed and dried. To the tanning bath containing the remainder of the treated skins was added sufficient sulfuric acid to bring the bath to approximately pH=2, following which the treated skins were further drummed for 2 hours, washed and dried. In each instance, white, full and well-tanned skins were obtained.

*Example 9*

20 parts of pickled kid skin, 20 parts of a 15% sodium chloride solution and 4 parts of the resin syrup of Example 7 were drummed overnight, washed and dried. White, full and well-tanned skins were obtained.

Repeating the procedure with the same quantities of materials and using the resin syrup of Example 2 in place of that of Example 7, similar results were obtained.

The drumming time may be varied and in general will depend upon the time required for exhaustion of the condensation product from the tanning bath.

If desired, acid in dilute solution may be employed to aid in the precipitation and hardening of the deposited solid condensation products. The hide may be pretreated with the acid, drained and then drummed with a solution of one of the condensation products. The acid may also be added to the tanning bath, but in such cases it is preferably added after the hide has been drummed with the syrup solution for a substantial length of time, i. e., at a point where further precipitation of the solid condensation product proceeds at a slow rate. The amount of acid added in each case will depend upon the alkalinity of the condensation syrups and on the acidity of the hide, as will be apparent to one skilled in the art of tanning.

Where pickled skins of high acidity are to be tanned by the present process, it may be desirable to reduce the acidity of the skins before subjecting them to action of the condensation products, as will be understood by one skilled in the art.

The white tanned skins obtainable by the process of the present invention may be further tanned by suitable processes, e. g., formaldehyde or alum tanning.

Since suitable variations and changes may be made in the invention without departing from the spirit and scope thereof, the foregoing description is intended by way of illustration except as defined in the appended claims.

We claim:

1. A process of tanning hides which comprises treating the hide with an aqueous solution of a water-dilutable, acid-sensitive condensation product of one mol of ammeline and about 2–4 mols of formaldehyde partially neutralized with an alkali of the group consisting of sodium and potassium hydroxides.

2. A process of tanning hides which comprises treating the hide with an aqueous solution of a water-dilutable, acid-sensitive condensation product of one mol of ammeline and about 2–4 mols of formaldehyde partially neutralized with sodium hydroxide.

3. White tanned hide having incorporated therein the solid condensation product of one mol of ammeline and about 2–4 mols of formaldehyde, said product being obtainable by the process of claim 1.

JOHN MARSHALL GRIM.
WILLIAM O. DAWSON.